Patented July 24, 1923.

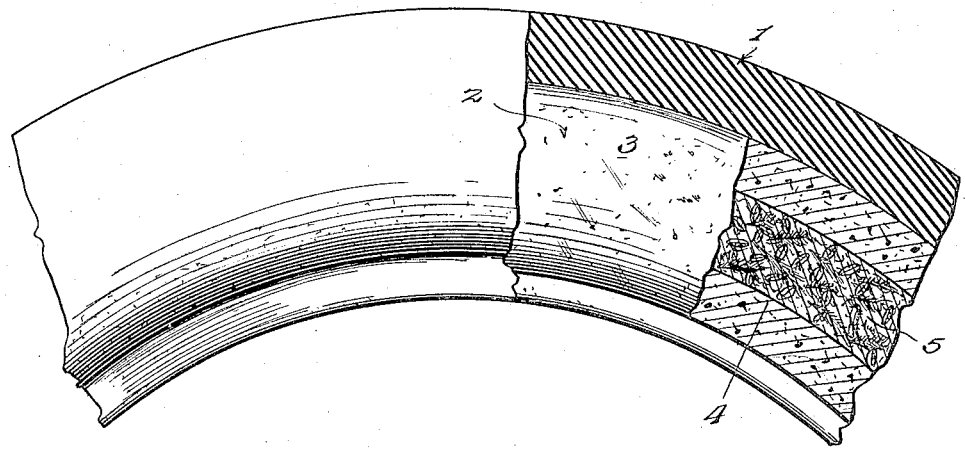
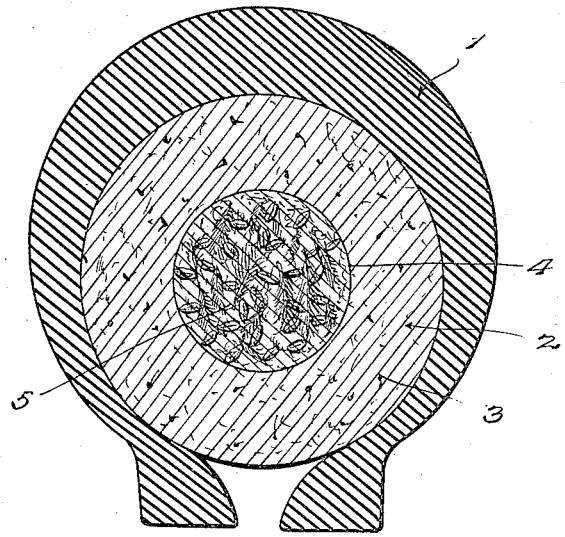

1,462,837

UNITED STATES PATENT OFFICE.

SALVATORE VITALIANO, OF HAZLETON, PENNSYLVANIA.

TIRE FILLER.

Application filed June 30, 1922. Serial No. 571,869.

*To all whom it may concern:*

Be it known that I, SALVATORE VITALIANO, a citizen of the United States, residing at Hazleton, in the county of Luzerne and State of Pennsylvania, have invented certain new and useful Improvements in Tire Fillers, of which the following is a specification.

This invention relates to improvements in tire fillers and has as its general object to provide an improved filler for employment in tire casings of the usual type in lieu of the pneumatic inner tube and which will possess practically the same cushioning qualities and yet not be subject to the annoyance attending punctures and blowouts.

Another object of the invention is to provide a filler which will be light in weight, resilient, and yieldable to the desired degree, and which will not be liable to deteriorate or become hardened or compacted through impacts.

Another object of the invention is to provide a filler which may be conveniently disposed within a tire casing and will require the exercise of little care in properly positioning it within said casing.

In the accompanying drawing:

Figure 1 is a view partly in side elevation and partly in section illustrating the filler embodying the invention arranged within a tire casing;

Fig. 2 is a vertical transverse sectional view through the filler and the casing within which it is arranged.

In the drawing the numeral 1 indicates in general an ordinary pneumatic tire casing which may be of any of the well-known types and within which the filler embodying the invention is to be employed in lieu of the usual inflatable inner tube.

The filler embodying the invention is indicated in general by the numeral 2. The filler comprises a body 3 which is preferably of annular tubular form and exteriorly of a diameter to fit within the tire casing. As stated this body is preferably of annular form and it is provided with a centrally located bore 4. By reason of the central location of the bore 4, the walls of the body 3 are substantially of uniform thickness. The body is preferably formed of cork or some other material possessing like qualities such, for example, as lightness, yieldability, resiliency, etc.

By forming the body with the bore 4, its resiliency and yieldability is increased, and it is better adapted to absorb the shocks of impact of the tire casing tread with the road surface. In order to provide against collapse of any portion of the hollow filler body, the bore 4 is preferably provided with a filling of some yieldable material or a combination of materials, such, for example, as chaff and feathers. This filling is indicated by the numeral 5 and while it is preferable to employ chaff and feathers for the purpose stated, other materials might be put to a like use. As stated the filler is light in weight, and in order to prevent packing of the feathers, the chaff is intermingled therewith and serves, by reason of its presence, to prevent the feathers becoming packed. In other words, the filler or core 5 does not add materially to the weight of the filler as a whole although by its employment it is permissible to make the body 3 of tubular form without incurring liability of crushing of the body or the crumbling of its wall. Furthermore, the feathers and chaff are materials of an inexpensive nature and are capable of being packed into the bore of the body 3 more or less compactly depending chiefly upon the size of the tire casing within which the filler is to be arranged.

The body 3 is referred to above as of annular form and it will be understood that the invention comprehends forming the body either in the form of a closed annulus or in the form of a split annulus. Also the body might be formed in sections but this is not so desirable a construction.

Having thus described the invention, what is claimed as new is:

A tire filler comprising a substantially annular hollow body of cork, and a substantially compact core of feathers and chaff occupying the interior of the said body.

In testimony whereof I affix my signature.

SALVATORE VITALIANO. [L. S.]